United States Patent
Biederman et al.

(10) Patent No.: US 8,347,485 B2
(45) Date of Patent: Jan. 8, 2013

(54) CENTRIFUGALLY-CAST SHORTED STRUCTURE FOR INDUCTION MOTOR ROTORS

(75) Inventors: Scott W. Biederman, New Boston, NH (US); Mark A. Osborne, Grand Blanc, MI (US); Michael J. Walker, Windsor (CA); Thomas A. Perry, Bruce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 291 days.

(21) Appl. No.: 12/704,812

(22) Filed: Feb. 12, 2010

(65) Prior Publication Data

US 2011/0198964 A1    Aug. 18, 2011

(51) Int. Cl.
   H02K 15/02    (2006.01)
(52) U.S. Cl. .......... 29/598; 29/596; 164/103; 264/272.2
(58) Field of Classification Search ............ 29/596–598, 29/732–736; 164/103–105, 109–112, 272.2; 310/211, 194, 156.64, 216.094; 264/272.1–272.4
See application file for complete search history.

(56) References Cited

U.S. PATENT DOCUMENTS

| | | | |
|---|---|---|---|
| 1,982,424 A | | 11/1934 | Fahlman |
| 2,381,616 A | * | 8/1945 | Pfleger .......................... 164/288 |
| 4,922,604 A | * | 5/1990 | Marshall et al. ................ 29/598 |
| 5,332,026 A | * | 7/1994 | Thieman et al. .............. 164/493 |
| 5,538,067 A | * | 7/1996 | Nakamura et al. ............. 164/112 |
| 5,806,169 A | * | 9/1998 | Trago et al. ..................... 29/596 |
| 5,887,643 A | | 3/1999 | Nakamura et al. |
| 6,991,021 B2 | * | 1/2006 | Ramirez et al. ................ 164/103 |
| 2011/0198964 A1 | * | 8/2011 | Biederman et al. ........... 310/211 |

* cited by examiner

*Primary Examiner* — Minh Trinh
(74) *Attorney, Agent, or Firm* — Reising Ethington P.C.

(57) ABSTRACT

A procedure for centrifugally casting a shorted structure around induction motor rotors is described. The method is commonly applied to a plurality of rotors disposed and arranged for rotational balance and supported on a suitable support, or optionally, on a plurality of supports arranged in layered fashion about a common rotational axis. The method comprises forming a wax representation of the shorted structure around a lamination stack; mounting a plurality of such lamination stacks in a mounting fixture and-attaching a suitable gating and runner system; forming an investment by coating the structure with refractory followed by melting out the wax; casting molten metal into the investment while it is rotating and aligning the mold to allow the centrifugal force generated to promote mold filling; and, continuing to rotate the investment until solidification is substantially complete.

16 Claims, 7 Drawing Sheets

CENTRIFUGALLY-CAST SHORTED STRUCTURE FOR INDUCTION MOTOR ROTORS

TECHNICAL FIELD

This application relates to processes for forming shorted structures comprising conductor bars and end rings on laminated cores of rotors for induction motors. More specifically, this disclosure relates to investment casting of shorted structures on rotor cores using rotating mold assemblies by which pairs of rotors may be produced at the same time.

BACKGROUND OF THE INVENTION

One candidate electric motor type for driving wheels of electric and hybrid vehicles is the induction motor. Induction motors, of course, may be designed in many different sizes and shapes for delivering rotational power.

A typical induction motor has a stationary annular wire-wound outer member of designed diameter and length called a stator. Often a three-phase alternating current is delivered to electrical leads of the stator so as to produce a magnetic field that rotates around the stator ring. A cylindrical rotor member carried on the rotating power shaft for the motor is placed closely spaced within the inner cylindrical cavity of the stator. The rotor has an inner cylindrical core of flat round steel plates, coated with electrically insulating material, and stacked as laminations with their circumferences aligned to form the cylindrical core so that it has a length complementary to that of the stator. This cylindrical core does not conduct electricity but it displays high electromagnetic permittivity.

Each laminated disk of the rotor core may be shaped with circumferential indentations, or the like, to carry several (e.g., 20-40) uniformly spaced, equal length, copper or aluminum electrical conductor bars extending from one end of the rotor core to the other. The spaced conductor bars may be uniformly slightly inclined to the cylindrical axis of the rotor core and the ends of each bar are connected to copper or aluminum end rings located on the rotor ends and co-axial with the rotor axis. This one-piece, cage-like structure of spaced and inclined conductor bars with end rings, carried on the laminated rotor core, is highly electrically conductive and termed a "shorted structure."

Because only a small clearance is maintained between stator and rotor, the rotating magnetic field of the stator enters the rotor, inducing a current in the embedded conductors. In turn, the conductor current produces its own magnetic field which is repelled by the stator magnetic field and causes the rotor to rotate. Inclination of the conductor bars with respect to the rotational axis of the rotor cooperates with the rotation of the magnetic field produced by the stator and permits a more uniform production of torque by the induction motor.

The shorted structure may be fabricated by assembly and joining of its individual components, the conductor bars and end rings. An alternative approach, which promised a shorter manufacturing time, has been to overcast the conductor bars and end rings as a complete structure on the lamination stack using die casting. However, rotors manufactured using the die casting approach have exhibited problems with excessive porosity and lower than optimum shorted structure (electrical) conductivity which has reduced process yield.

Thus there is need for a process for rapidly fabricating induction motor rotors and particularly the shorted structure of such rotors.

SUMMARY OF THE INVENTION

This invention provides a method for casting the shorted conductor bar structure of an induction motor rotor onto a rotor lamination stack in a manner which enables consistent quality and high production rates. The shorted structure typically comprises many equal-length conductor bars and two end rings. Conductor bars, oriented to be aligned generally at an acute angle with the rotational axis of the rotor, extend the length of the rotor lamination stack and are equally spaced around the circumference of the rotor lamination stack. The conductor bars terminate in the end rings, one of which is positioned at each extremity of the lamination stack. The conductor bars are contained within and thereby mechanically restrained by the lamination stack while being generally positioned near the circumference of the rotor stack.

The method applies investment (or "Lost Wax") casting process practices to a mold assembly comprising at least one mold suited for casting of a unitary shorted structure on a complementary laminated plate stack. The shorted structure comprises a first end ring attached to one end of a number of conductor bars and a second end ring attached to the other end of the conductor bars. Each mold will be constructed to permit the entry and flow of molten metal in the direction from one end ring of the conductor bars to their other end ring. The mold body is rotated about a rotation axis in a circular path with the laminated plate stack axis (the rotor axis) aligned with a radius of the circular path and molten metal is introduced at the rotation axis. Thus, the resulting centrifugal forces are suitably directed to efficiently urge the molten casting alloy into the mold along the rotation axis of the rotor to enhance feeding of any metallurgical shrinkage that may develop. Molten metal first enters the mold at a mold cavity corresponding to an end ring, then progresses along mold channels corresponding to the conductor bars and finally fills the mold cavity corresponding to the opposing end ring. Thus the mold orientation promotes metal flow in a direction substantially corresponding to the conductor bar orientation.

It is apparent pairs of diametrically opposing molds for the rotor structures may be rotated in combinations with the metal fed from the center of rotation of the opposing rotor mold assemblies. Thus, this casting process may be conducted to enable simultaneous casting of conductor bars and end rings for a plurality of rotors to efficiently enable higher volume production. Hence, the orientation of each of the plurality of rotors will be suitable for constructive utilization of the centrifugal force by all rotors. Thus, some number of rotor molds may be radially disposed about the rotation axis. To minimize imbalance during rotation, rotor molds may be positioned in the mold in generally symmetrical configurations, usually with pairs of molds arranged in opposition and disposed at generally equal distances from the rotation axis. Such configuration will result in an assemblage of laterally-spaced rotor molds all of which are located at a common height and thereby form a mold layer. Yet higher production volumes may be obtained by suitably stacking a plurality of such mold layers to enable casting additional rotors during a single pouring operation of the molten metal at the centers of rotation of the several molds.

The mold making process comprises molding a wax form or pattern corresponding to the geometry of the desired shorted structure around a rotor lamination stack or stacked individual laminations. Then a ceramic mold, an investment, is developed by application of ceramic particles to a form comprising a plurality of rotors and their associated wax pattern of the shorted structure, individually attached to a wax runner pattern and with each runner assembled to a common wax sprue pattern. The investment is heated to a temperature sufficient to melt the wax which is substantially drained from the investment. Further heating, to a much higher temperature, combusts the remaining wax and preheats the investment so that its temperature more closely matches the temperature of the casting metal. The investment is then oriented appropriately to optimize mold filling as described above, supported in compacted sand and fed with liquid metal while being rotated about an axis generally corresponding to the centerline of the common sprue. Although other configurations may be employed, it is preferred that the conductor bars be aligned generally parallel to the resultant centrifugal force and that the molten metal enters the mold at one end ring, thereafter progressing along the conductor bars and subsequently filling the end ring opposite the one by which it entered. Rotation is maintained until solidification is substantially complete.

The above features and advantages and other features and advantages of the present invention are readily apparent from the following detailed description of the best modes for carrying out the invention when taken in conjunction with the accompanying drawings.

DESCRIPTION OF PREFERRED EMBODIMENTS

Induction motors operate through the repulsive interaction of a rotating electrically-generated magnetic field in a stator with an induced magnetic field arising from the induced current in an arrangement of conductors positioned on the rotor. Induction motors enjoy wide application and are available in a range of configurations depending primarily on their electrical rating but influenced also by packaging constraints. Thus many variants of the motor elements exist. In particular, the rotors may exhibit pronounced differences in length, diameter etc.

In common with other motors, particularly large motors suitable for automotive application, the magnetic forces are substantial and require that any conductors be restrained and securely anchored. Thus the rotor conductors are typically not positioned on the surface of the rotor but are instead embedded, partially or completely, within the rotor so that they may be well supported by the rotor structure.

Figure 1A:
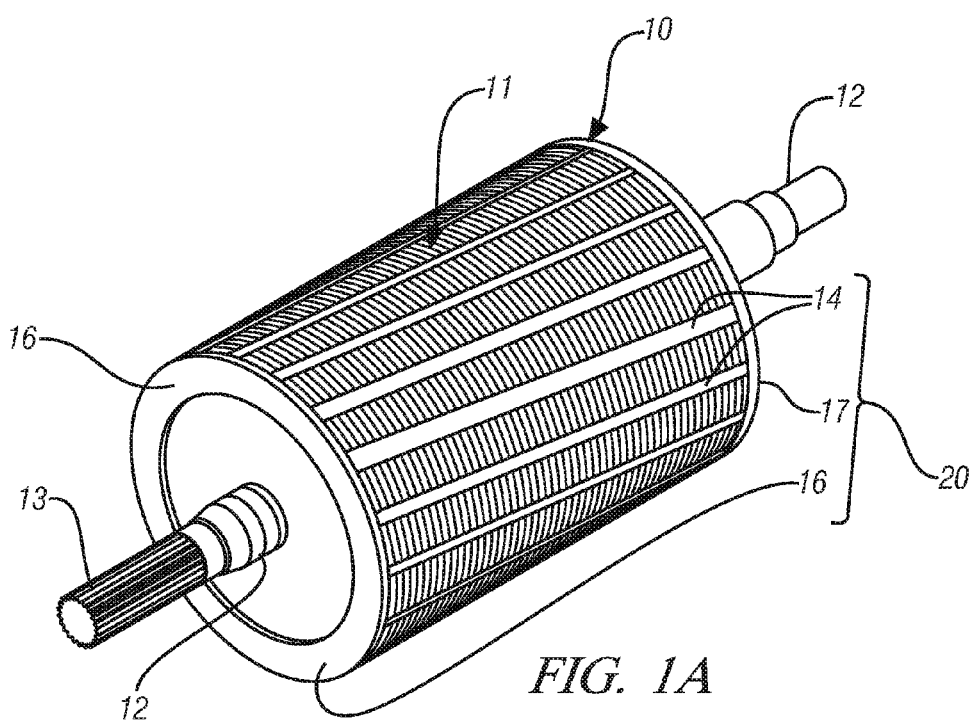
FIG. 1A shows an exemplary rotor design and construction suitable for use in an induction motor.

A typical rotor 10 is illustrated in FIG. 1A showing a lamination stack 11 (a stack of bonded disks or sheets of like shape) surrounding a supporting shaft 12 with splines 13 on one end. The lamination stack is surrounded by shorted structure 20 comprising conductor bars 14 and end rings 16 and 17, the end rings 16 and 17 and conductor bars 14 being connected together to form an electrically-conductive cage, shorted structure 20, around the lamination stack 11. In this example the conductor bars 14 are shown as inclined to the axis of rotation of the rotor 10, a relatively common configuration adopted to minimize motor speed variations or torque ripple.

The lamination stack 11 is fabricated as a laminated assemblage of generally annular shaped plates or disks cut or stamped from rolled sheet, usually by a blanking process using matched dies mounted in a sheet metal press. Less frequently laser cutting or electrical discharge machining may be employed. The individual disks are then suitably aligned and stacked atop one another, usually separated by an interposed electrically insulating layer or coating, and permanently attached to one another. Most often the laminations are fully formed as-separated and assembled by carefully positioning one lamination atop another in prescribed orientation. Less-commonly the desired external features are imparted by a separate machining operation conducted on the lamination stack after their assembly.

The laminations are magnetically 'soft', that is readily magnetized, and typically prepared from electrical steel with a chemistry largely comprising iron with up to 6 percent silicon by weight and less than 0.005 percent by weight carbon. A commonly-used composition is iron with 3 weight percent silicon.

Figure 1B:
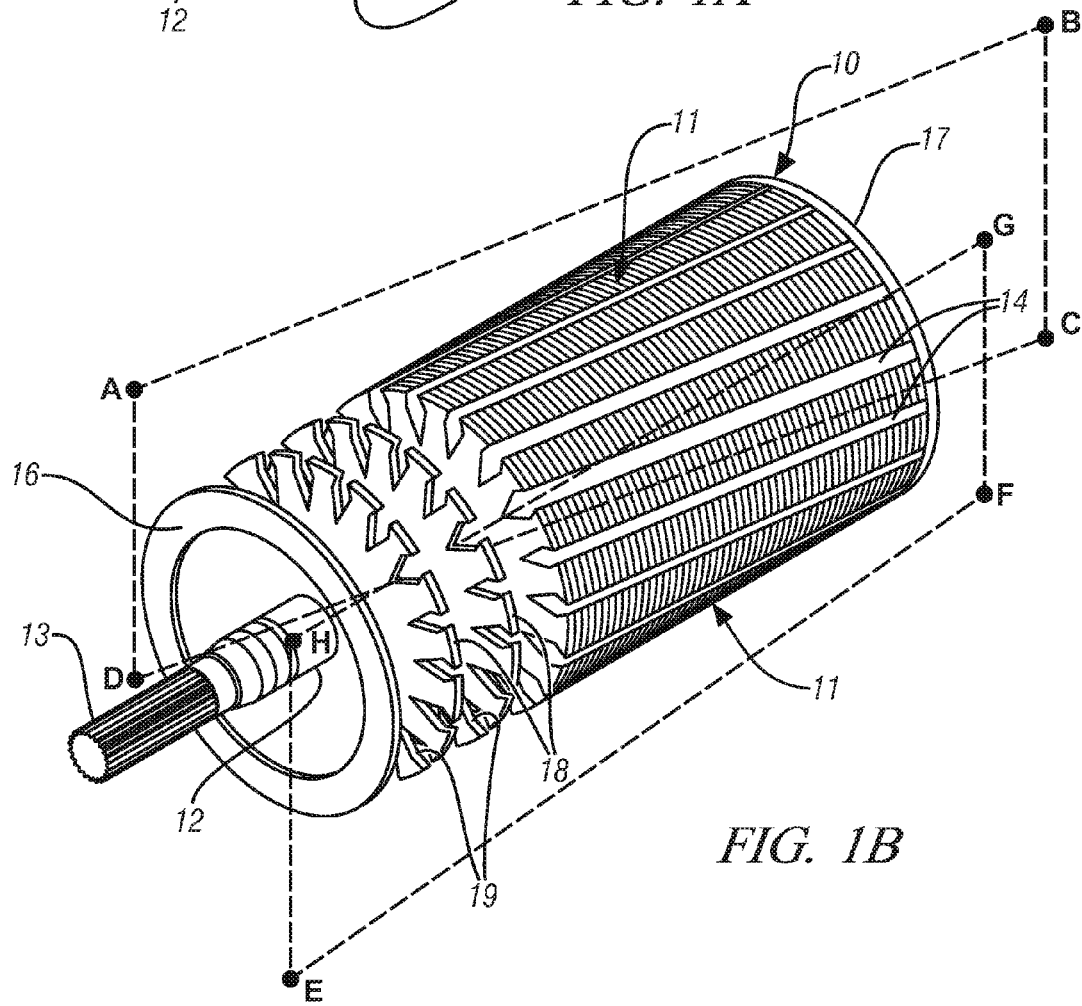
FIG. 1B shows a partially exploded view of the exemplary induction rotor of FIG. 1A better illustrating the interrelationship between the lamination stack and the conductor bars and end rings, which in combination, comprise a shorted structure. Also shown are two planes of partial section, ABCD and EFGH which, when combined produce the combination section of FIG. 3. The two end rings shown in exploded view at the left end of FIG. 1B are illustrated without their conductor bars to better show their retaining slots for conductor bars.
Figure 1C:
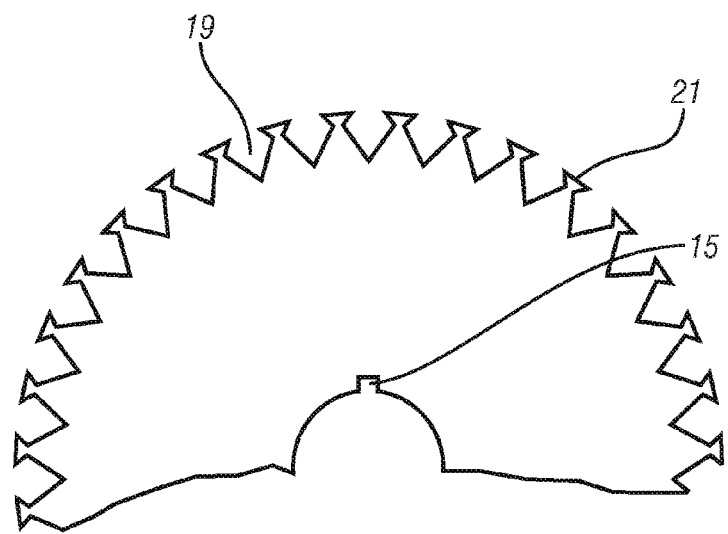
FIG. 1C shows a fragmentary plan view of a lamination as shown in FIG. 1B to better illustrate some of its features.

Additional details of rotor 10 may be noted by consideration of partially-exploded view FIG. 1B. This partially exploded view shows two individual laminations 18 separated from lamination stack 11 and illustrates the form of the conductor bar retaining slots 19. The conductor bar retaining slots 19, as better seen in FIG. 1C, are generally shaped like the letter "V" but have a partially closed opening at the rotor periphery 21 to restrain the conductor bar against expulsion due to the high magnetic forces. FIG. 1C also shows a feature 15 to aid in angularly locating a lamination to the shaft 12 as will be discussed in greater detail later.

The shorted structure may be fabricated as an assembly. However a more promising approach is to cast the shorted structure as a single piece over the lamination stack 11. Such an approach is challenged by the thermal mass of the lamination stack which will tend to rapidly extract heat from the inflowing molten metal and may choke off the flow of molten liquid prematurely causing flow passages to freeze before the mold fills completely. Die casting, which may employ a water cooled mold and uses mechanical assistance to rapidly charge the molten liquid to the mold, has been used but has generally failed to consistently generate the desired quality or to deliver the expected productivity enhancement required by hybrid traction motors.

The subject invention employs a one piece ceramic mold or investment formed using the lost wax process. The mold is then rotated before being charged with molten metal. Rotation is maintained during pouring and continues until solidification occurs. Rotation induces and generates a centrifugal force which, in combination with appropriate mold positioning will be effective in urging the molten metal into the mold and promoting mold fill before the conductor bars, sprue and/or runner structure freezes and prohibits further metal addition. It is preferred that the direction of rotation be such as to generate a centrifugal force which acts in a direction parallel to the conductor bars.

As is well known, because of shrinkage and contraction, the volume of a casting is usually less than the volume of the mold into which it is cast. Thus, suitable adjustment to the mold dimensions, usually described as a pattern-maker's allowance, is made to ensure the finished casting dimensions. These considerations apply to the process under discussion. Thus, where reference is made to a wax pattern it will be appreciated that the general geometry of the cast feature and the pattern will be substantially identical but that the dimensions of the wax and cast features will differ.

Figure 2:
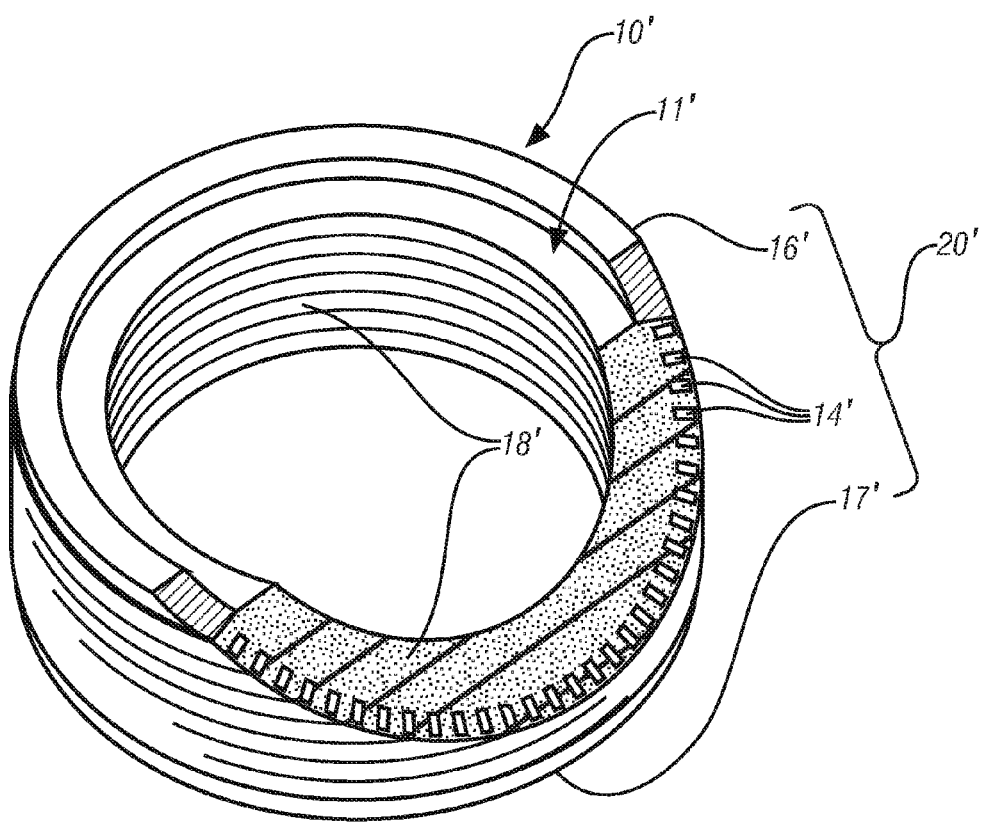
FIG. 2 shows, in partial cutaway, a second rotor design, suitable for the practice of this invention.

FIG. 2 shows a rotor 10' of a second design with a lamination stack 11' comprising laminations 18' and shorted structure 20' comprising conductor bars 14' and end rings 16', 17'. Rotor 10' is likewise representative of those suitable for practice of this invention. It will be appreciated that the details of rotor 10' differ from those of rotor 10 with respect to at least length, external diameter, internal diameter and conductor bar placement. Such design variances are commonly encountered and are not prejudicial to the practice of this invention which is intended for broad application to induction motor rotor variants in common use.

A point of difference between the rotor design of FIGS. 1 and 2 is that in FIG. 2 the conductor bars 14' are fully surrounded by the lamination stack 11'. Inasmuch as the conductor bar opening will generally be formed during a single press stroke such a feature may be readily accommodated. This design ensures that if the rotor is subjected any machining or grinding processes for balance or concentricity or to achieve rotor-stator clearance tolerances, the current-carrying capability of the conductor bar will not be compromised.

Figure 3:
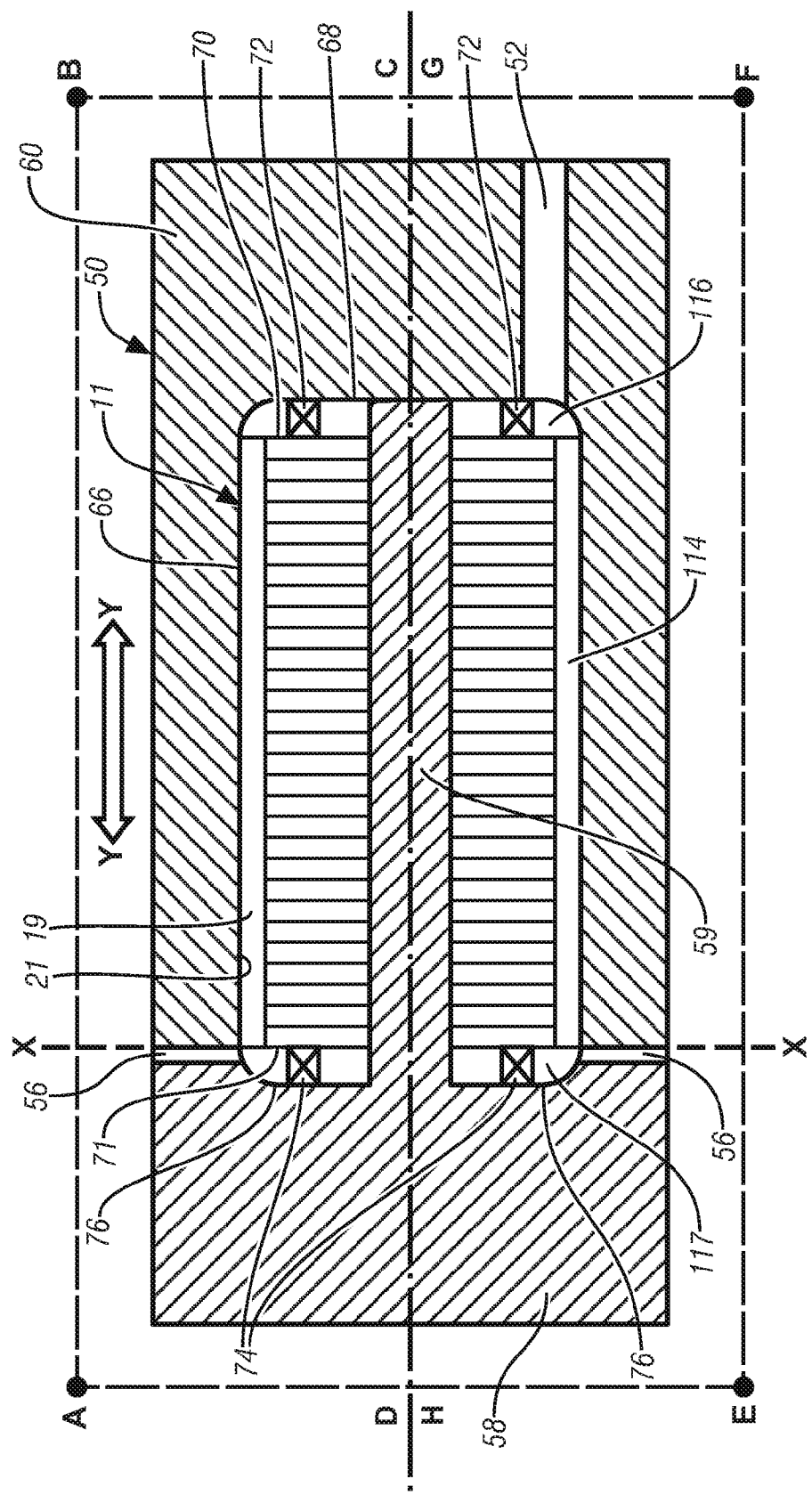
FIG. 3 shows, in schematic fashion, a combination sectional view of a mold suitable for application of a wax overcoat to a lamination stack. The view combines two sections, each taken along the inclined conductor bar mold cavities. Thus the combination section combines the section taken along plane ABCD of FIG. 1B and the section taken along plane EFGH of FIG. 1B thereby showing the conductor bar as continuous in both segments. For clarity the sectioning planes of FIG. 1B are identified.

FIG. 3 shows, a composite section, obtained by combining sections like those shown at ABCD and EFGH in FIG. 1B, of a lamination stack 11 positioned in a split mold 50 suitable for casting wax in locations corresponding to the desired locations of conductor bars 14 and end rings 16 and 17 shown in FIG. 1B. The planes of section ABCD and EFGH as shown in FIG. 1B are chosen to enhance the clarity of the figure and specifically to convey that the conductor bar openings 114, are continuous. It will be appreciated that conductor bar openings 114 of FIG. 3 are intended to receive cast, electrically conducting material and thereby form conductor bars 14 of FIGS. 1A and 1B with a section as best shown at 19 in FIG. 1C. Similarly end ring openings 116 and 117 of FIG. 3 when filled with cast electrically conducting material will form end rings 16 and 17 respectively of FIGS. 1A and 1B. Thus the planes of section are inclined to the rotational axis of the rotor and sectioning planes ABCD and EFGH are oppositely inclined to the rotational axis. The individual sections corresponding to sectioning planes ABCD and EFGH have been combined in the composite section of FIG. 3. It will be appreciated that FIG. 3 will show a true section for a rotor geometry where conductor bars are not inclined to the axis of rotation but instead are parallel to the rotation axis.

The wax-casting mold 50 is intended to be reusable and will generally be fabricated of metal for durability. Since the low melting point of wax does not mandate use of more heat resistant materials, aluminum alloy is a suitable mold material and offers easy machining. It will be appreciated that operation of the mold will require that it be mounted in a press or similar device and require additional features such as a guide pins, mounting plates etc. which have been omitted for simplicity.

The mold comprises a first mold section 58 including a core feature 59 and a second mold section 60 separated along a parting line XX. The mold incorporates provision for injection of molten wax through runner 52 and has vents 56. The cylindrical periphery 21 of lamination stack 11 is fitted tightly to the cylindrical walls 66 of second mold section 60 to effectively bar deposit of wax on the outer periphery of lamination stack 11. Further, the close fit between the laminations and the mold section facilitates aligning the laminations. A similarly close fit is desired between the inner bore of the laminations and the outer surfaces of core 59. Introduction of complementary features on the inner bore of the laminations and the outer surfaces of core 59 may also be used to facilitate alignment of stacked laminations. For example the inclination of conductor rods 14 as shown in FIG. 1A would be readily achieved by inclining a protuberance (not shown) on core 59 complementary to a slot or recess on the bore of the lamination such as is shown at 15 in FIG. 1C, or vice versa. It may also be noted that the cast conductor rods will act to mechanically secure the laminations to form the lamination stack so that the laminations may be loaded into the mold, or more preferably, onto the core individually, potentially facilitating stack assembly.

The outwardly-facing end lamination 70 of lamination stack 11 is sealingly spaced apart, such as by stops 72, from second mold surface 68 to create annular opening 116. Similarly the outwardly-facing end lamination 71 of lamination stack 11 is sealingly spaced apart, such as by stops 74, from first mold surface 76 to create annular opening 117. Thus molten or flowable injection molding wax formulated from hydrocarbon wax, natural ester wax, synthetic wax, natural and synthetic resins, organic filler materials and water to achieve suitable characteristics as is well known to those skilled in the art, may be introduced through runner 52. As depicted in FIG. 3, the wax on entering the mold will first fill the annular region 116 corresponding to a first end ring, then flow along channels 114 corresponding to the conductor bars before filling regions 117 on the opposing end surface of the rotor to form the second end ring. Vents 56 will enable venting of air initially present in the mold. Alternatively the mold may be evacuated prior to introduction of wax and the vents eliminated.

When the wax has solidified and hardened, mold segments 58 and 60 may be separated along split line XX by motion in a direction indicated by double arrow YY. As depicted, the wax over-molded lamination stack including the wax runner pattern (designated 52' in FIGS. 4 and 5) may now be readily removed from the mold, if necessary with the aid of an ejector pin (not shown), again along direction YY and the wax sections corresponding to vents 56, if present, removed.

It will be appreciated that FIG. 3 is exemplary and not restrictive and that alternate mold designs incorporating different wax fill geometries and mold segment geometries may be employed. Such variants are fully comprehended by the invention. Further, although not preferred, the wax features corresponding to the conductor bars, end rings and runner, may also be built up by hand, for example, by laying up shaped wax forms and attaching them together by co-melting the contacting forms.

Figure 4:
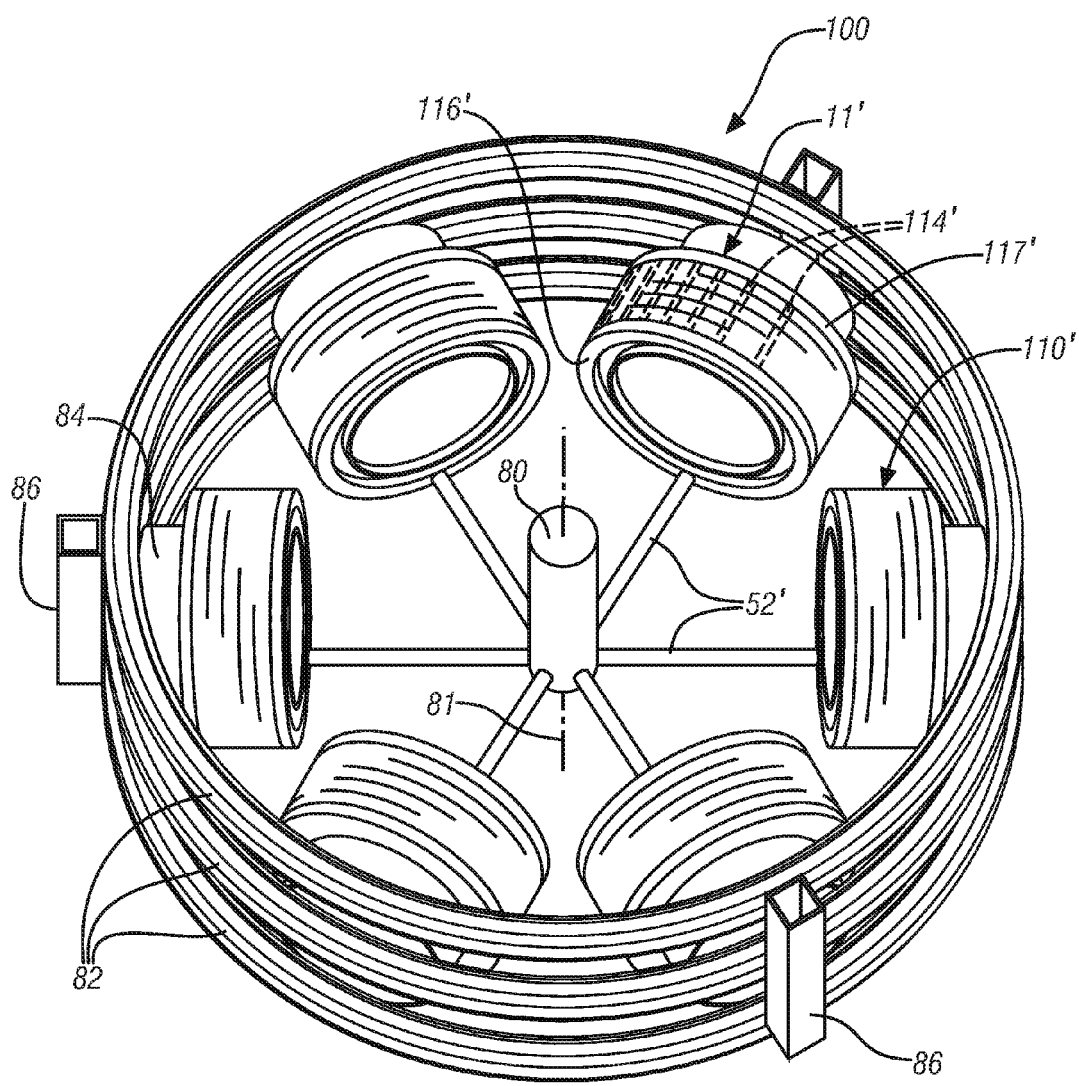
FIG. 4 shows an assembly of six rotor shorted structure wax patterns, for forming the rotor design of FIG. 2, positioned in a circle as three sets of opposing mold pairs on one planar layer of a centrifugal casting fixture with wax runner patterns attached to a common wax sprue pattern at the center of the axis of rotation of the mold assembly.

FIG. 4 shows a plurality of wax-overmolded lamination stacks 110' after being overmolded with wax in a mold such as shown in FIG. 3. These overmolded lamination stacks are positioned on a casting fixture 100 which includes a wax sprue pattern 80, attached to all of the wax runner patterns 52' associated with each of the wax-overmolded lamination stacks 110'. Attachment of wax runner pattern 52' to wax sprue pattern 80 is accomplished by co-melting and adjoining the abutting portions of each individual pattern. Preferably a common wax is used for all patterns so that when the wax cools and solidifies it will constitute a joint with the same characteristics as the pattern features. Wax-overmolded lamination stacks 110' are derivative of the rotor 10' shown in FIG. 2 and comprise lamination stack 11', wax features 114' corresponding to conductor bars 14', wax feature 116' corresponding to end ring 16' and wax feature 117' corresponding to end ring 17'. These features are shown and indicated on only one of the overmolded lamination stacks of the figure but are common to all overmolded lamination stacks.

The wax-overmolded lamination stacks are positioned in opposition to facilitate balance and are individually supported on a supporting feature 84 dimensioned to slidably engage the inner diameter of wax-overmolded lamination stacks 110' with minimal clearance. Supporting features 84 are themselves attached to a supporting structure comprising a stacked array of annuli 82 supported and attached by a plurality of ribs 86. All wax runner patterns 52' are attached to a common wax sprue pattern 80. The eventual axis of rotation 81, corresponding to the centerline of wax sprue pattern 80 is also shown.

The structure depicted for the fixture is illustrative only and various modifications to the structure shown are comprehended in this invention. Without limitation these may include: variations in rotor support features 84; or variations in the number or distribution of rotors accommodated provided the resulting assembly is substantially balanced; or of the nature of the supporting structure 82; or of its support members 86. For example: the rotor and shaft assembly of FIG. 1 might be supported using an internally splined hollow cylinder sized to slidably engage splines 13 on shaft 12 of FIG. 1; the supporting structure might comprise more or fewer annular features like that shown at 82 in FIG. 4 and the features might be of greater or lesser diameter and/or of alternate cross-section; and finally the support members shown as 86 in FIG. 4 might be modified in number, cross-section or incorporate additional features for improved performance as illustrated in FIGS. 6 and 7.

Figure 5:
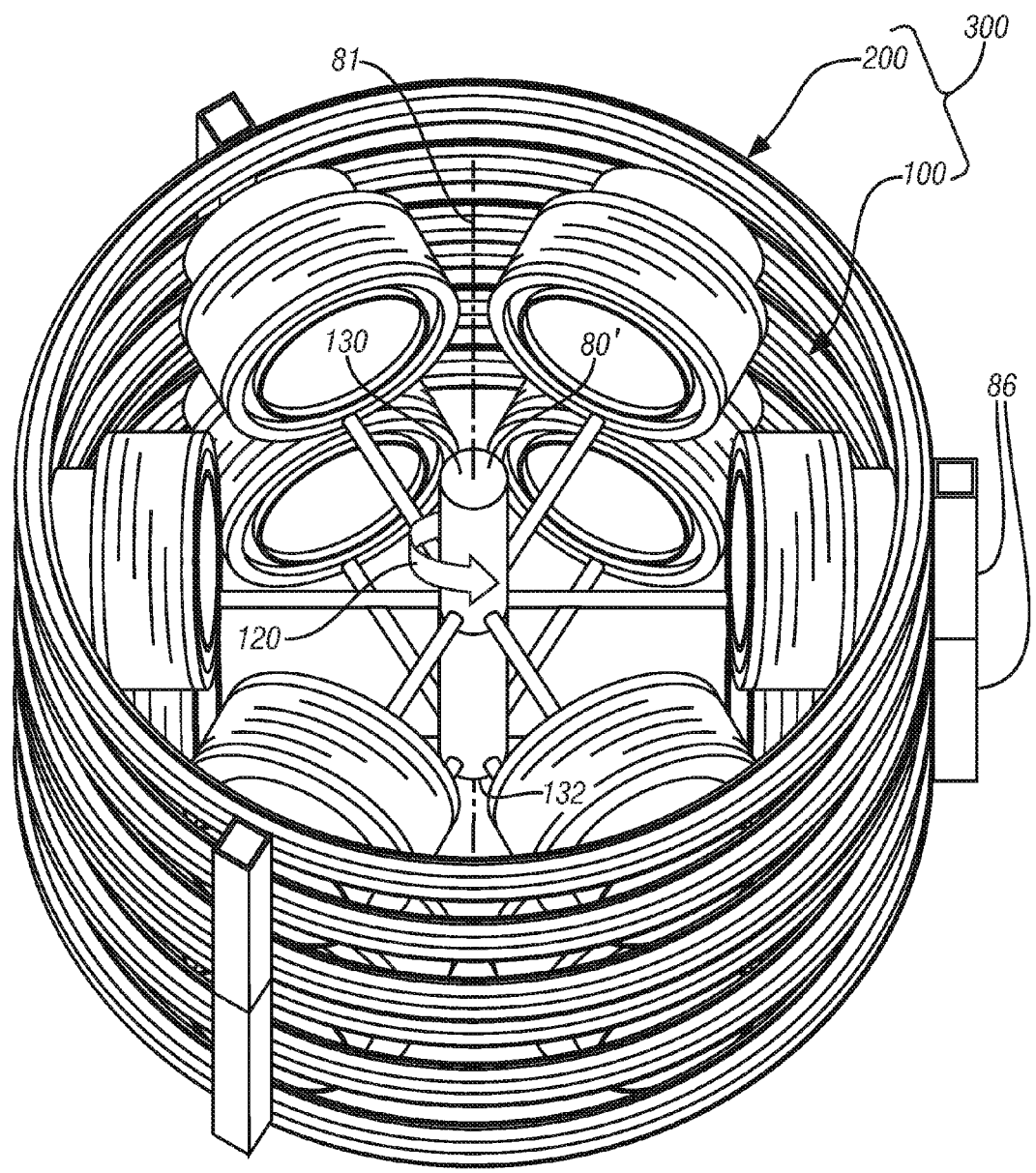
FIG. 5 shows a centrifugal casting wax pattern suitable for casting a shorted structure on a plurality rotors. The pattern has two stacked layers, each layer being as shown in FIG. 4, and illustrating the rotational axis employed during casting. A common wax sprue pattern is used for all layers.

FIG. 5 illustrates a partial build-up of a casting fixture 300 comprised of two of the layers shown in FIG. 4, depicted as a first layer 100 and a second layer 200. Ribs 86 are aligned and serve to releasably join first layer 100 to second layer 200. For convenience the rotors in each of the layers are depicted as aligned but it may be advantageous to stagger the rotor positioning in the different layers if such a configuration improves rotational balance. As will become clearer from the discussion of the methods of attaching the layers staggering the rotor orientation may require that additional ribs 86 be provided. The additional ribs may be positioned symmetrically in the substantially 120° sectors between the ribs depicted in FIGS. 4 and 5.

Any convenient attachment procedure may be followed. For example as represented in FIG. 4, ribs 86 are hollow. Thus layer alignment may be enabled by sliding a tight-fitting rod of complementary shape through ribs 86 of each layer and tying layers 100 and 200 together with wire or other suitable material.

Figure 6:
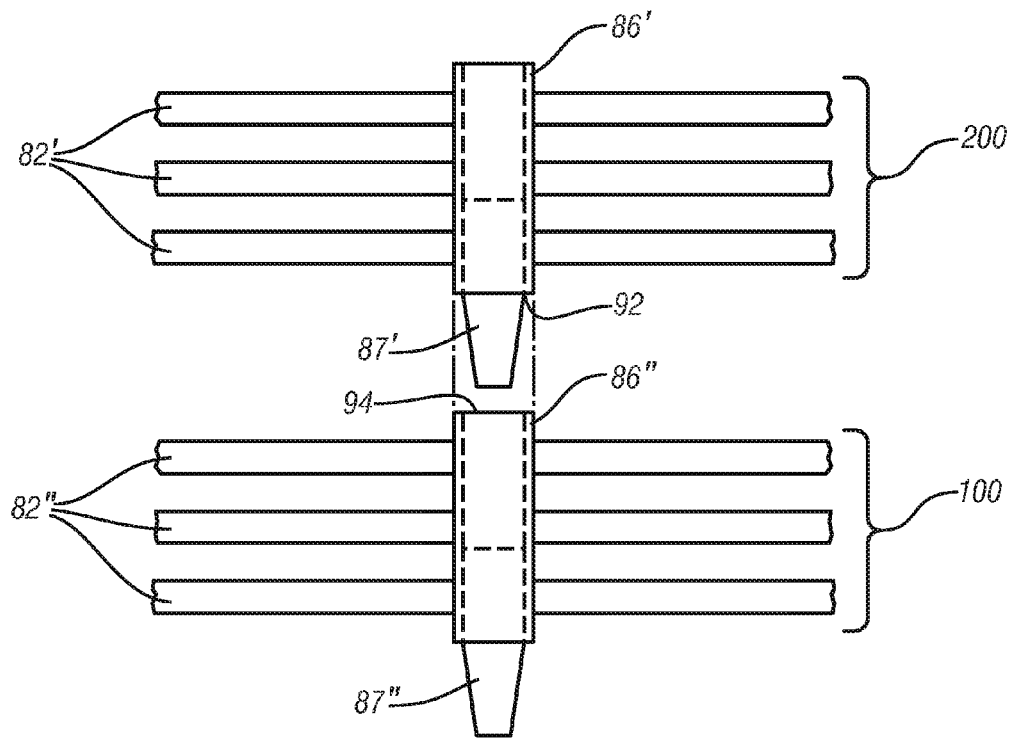
FIG. 6 shows an embodiment of a feature of the centrifugal casting fixture to better restrain relative motion of the stacked layers of FIG. 5.

Alternatively, in a second embodiment, best illustrated at FIG. 6, ribs 86' and 86", respectively mounted on annular features 82' and 82", are shown. Ribs 86', 86" have been formed by the incorporation of shaped plugs 87' and 87" permanently attached to one end of each of ribs 86' and 86", for example by riveting or other mechanical fastener or by welding or by interference fit or other suitable means. Plug 87' extends beyond surface 92 of rib 86' and is adapted for easy insertion into the open end of rib 86", for example by adoption of a tapered cross-section as shown. Thus, as shown in FIG. 6, layer 200 may, provided ribs 86' and 86" are approximately aligned, be positioned atop layer 100, enabling plug 87' to guide and engage the opening of rib 86" so that end surface 92 of rib 86' is brought into contact with surface 94 of rib 86". Thus layers 100 and 200 are locked together against rotation but again would require tying together to restrain them from being pulled apart.

Figures 7A, 7B, 7C:
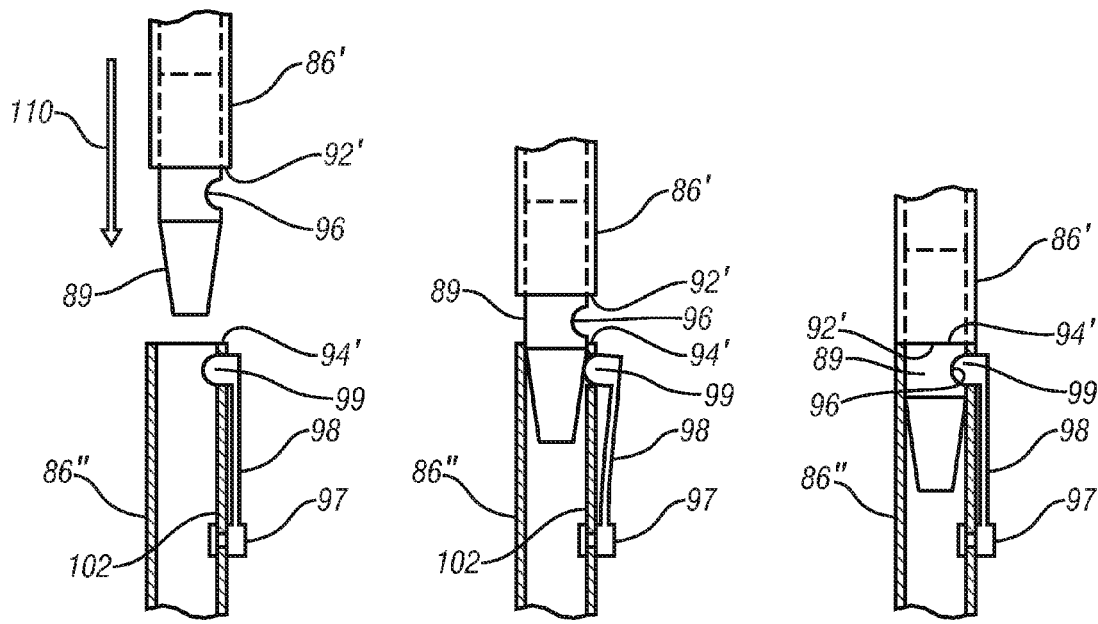
FIGS. 7A, B and C show a second embodiment of a feature of the centrifugal casting fixture to better restrain relative motion of the stacked layers of FIG. 5 and illustrate its mode of operation.

In a yet further variant shown in FIG. 7A, tapered plug 89 attached to one end of rib 86' incorporates a recess 96 and rib 86" incorporates a pin 99, complementary in shape to recess 96, extending through sidewall 102 of rib 86" and supported on spring strip 98 attached to sidewall 102 by rivet 97. Thus as rib 86' is lowered in the direction indicated by arrow 110 after being brought into general alignment with rib 86" the end of plug 89 guides and engages the open end of rib 86". As rib 86' descends, the taper of plug 89 displaces pin 99 and bends and tensions spring strip 98 as shown in FIG. 7B. With continued motion of rib 86' surface 92' of rib 86' is brought into contact with surface 94' of rib 86" and recess 96 aligns with pin 99, which under the urging of tensioned spring strip 98 is displaced into recess 96 as indicated in FIG. 7C. When configured as shown in FIG. 7C, layers 100 and 200 (FIG. 5) are fully restrained.

It will be appreciated that the specific locking mechanisms and devices described above are intended to be illustrative and not limiting and that other designs and configurations may be employed without departing from the scope of the invention.

Returning to FIG. 5 it will be noted that layers 100 and 200 share a common wax sprue pattern 80'. Additional layers 100 (FIG. 4) may be incorporated and it is anticipated that a casting fixture may include up to four layers. Additional layers would continue to share a common wax sprue pattern developed by extension of sprue pattern 80' at end 130 or end 132. Such a configuration would, based on the configuration shown as 100 in FIG. 4 enable up to 24 rotors to be cast in a single pour. During casting and solidification the casting fixture will be rotated about axis 81 coincident with the centerline of wax sprue pattern 80'. A suitable direction of rotation is indicated by arrow 120, but rotation opposite that shown by arrow 120 would also be effective.

The casting fixture is then used to create an investment, a ceramic mold suitable for containing molten metal. Typically the investment is produced by a series of sequential steps. First the casting fixture is dipped into a slurry of fine refractory material which will deposit as a thin layer on the fixture surfaces and then letting any excess drain off, so that a uniform surface is produced. The slurry may incorporate a variety of ceramics in varying proportions ranging in size from about 45 to 75 micrometers (200-325 mesh) and suitable to enable any fine details of the finished casting to be accurately reproduced. Next, the casting fixture is stuccoed, or overcoated with coarser ceramic particles, including mullite, ranging in size from about 300 to 1000 micrometers (18-50 mesh), by dipping it into a fluidized bed, placing it in a rain sander, or by applying by hand. Finally, the coating is allowed to harden. These steps may be repeated to build up the ceramic coating to the desired thickness, which is usually 5 to 15 mm (0.2 to 0.6 in).

Common refractory materials are used to create the investments. These include: silica, zirconia, various aluminium silicates, and alumina. The silica may be quartz or fused silica. Aluminium silicates, mixture of alumina and silica, typically have an alumina content ranging from 42 to 72% and include mullite at 72% alumina. Particularly during the initial slurry-based coat the choice of refractory will be informed by the need to suppress reaction between refractory and molten metal and may promote the use of zirconia-based ceramics. The binders used to hold the refractory material in place include: ethyl silicate (alcohol-based and chemically set), colloidal silica or silica sol, set by drying, sodium silicate, and a hybrid of these controlled for pH and viscosity. Alcohol-based binders may be preferred in practice of this invention to minimize corrosion of the ferrous lamination materials. Where aqueous binders are used the laminations may be protected by a thin barrier coating, for example of shellac, applied by spraying or by dipping in a dilute solution with a fast-evaporating and non-corrosive solvent.

Once the refractory has been applied in required thickness and dried, the entire structure of FIG. 5 is enclosed in a substantially-continuous layer of ceramic with all locations into which molten metal is to cast being occupied with wax.

The wax is initially removed by gently heating the casting fixture, for example in a steam autoclave, so that the wax will melt and run out for collection and recycling. The casting fixture is then 'burned out', that is heated to a temperature of about 1800-2200° F. in an oxidizing atmosphere to combust and remove all remnant wax and render the investment suitable for receipt of the molten metal.

Figure 8:
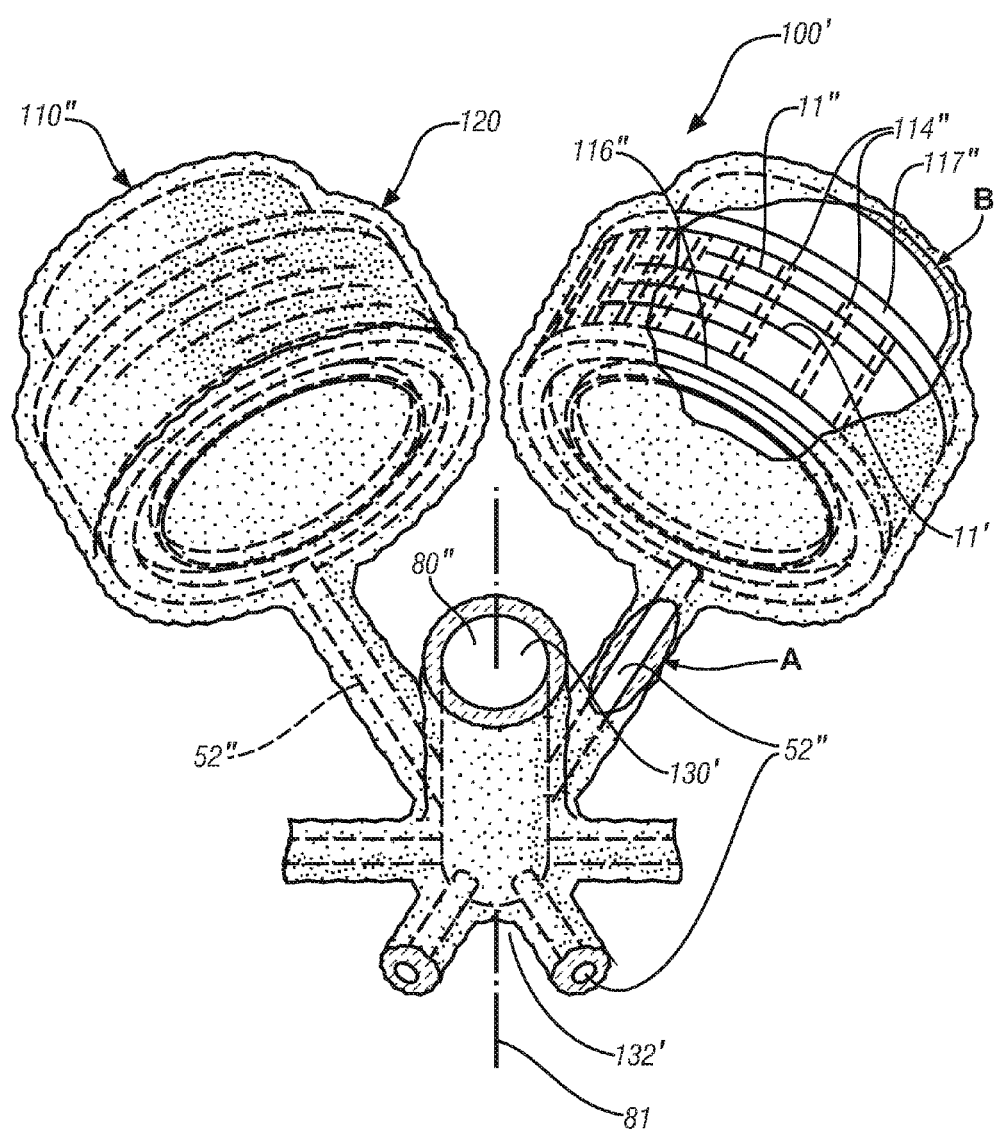
FIG. 8 shows a portion of the six rotor shorted structure wax patterns shown in FIG. 4 after further processing to coat the pattern with ceramic and remove the wax to form an investment suitable for receiving molten metal.

A fragmentary view of such an investment 100' is shown in FIG. 8, which focuses on only a portion of the pattern shown in FIG. 4, with the pattern shown in ghost for reference. Supporting structure elements 82, 84 and 86, though not shown for clarity, remain to provide support. The investment is covered by a continuous layer of ceramic material 120. Removal of the wax has created a sprue 80" with a centerline 81 and runners 52", shown generally in ghost and in cut-away at location 'A'. Thus molten metal entering the sprue 80", may be transported to ceramic-encased lamination stack 11" through runners 52". Absent the wax, ceramic-encased lamination stack will contain cavities 114", 116" and 117" (commonly present in all of the ceramic-encased lamination stacks but shown and identified only at cutaway section 'B') suitable for transporting and accepting the molten metal to form the conductor bars 14' and end rings 16', 17' shown in FIG. 2.

The 'burn out' step is also effective in preheating the investment and thereby reducing the temperature difference between the molten metal and investment during the casting process. The preheated investment will be effective in increasing the fluidity of the cast metal and act to prevent or minimize opportunity for misruns during the casting process. The investment is then inserted and positioned in a chamber or container which is agitated or vibrated while sand of prescribed composition, typically mullite although silica may also be used, and of minimal moisture content with a distribution of particle sizes ranging from 150 to 840 micrometers (100-20 mesh) is added at a controlled rate. This procedure will compact the sand around the investment, providing support and rendering it capable of sustaining the, possibly at least partially unbalanced, centrifugal forces generated during casting. The assemblage of the container and its sand-supported investment comprise the mold.

Because the lamination stacks comprising the rotors are ferrous, they may function as chills during the casting process, efficiently extracting heat from the inflowing molten metal, lowering its temperature and causing it to freeze before the mold is filled and producing misruns. To forestall this it is generally desirable to at least preheat the investment, including the lamination stacks, to a temperature at least close to the melting point of the casting alloy. The preheating which occurs on burnout may be adequate if sand fill, mold preparation and pouring occur promptly, before the investment loses appreciable heat to the poorly heat-conducting sand. However, although less preferred, additional heat may be provided, for example by heating the mold in an oven, prior to pouring if necessary.

The mold with its preheated investment is then rotated about axis 81 (see FIGS. 5 and 8) with a rotational speed of between 1 and 300 rpm and the molten metal is introduced to the mold. For example the molten metal may be top fed, by being poured into a pouring cup, not shown, attached directly to end 130' of sprue 80" or, more preferably with the addition of further melt distribution channels (not shown), bottom fed, so that the molten metal enters the mold at end 132' of sprue 80". The molten metal will typically be high purity electrical grade copper or aluminum to assure minimal electrical resistance in the finished casting but it may be preferred to use aluminum or copper alloys which may impart additional strength. The use of such higher strength alloys will be more preferred in higher performance motors which will subject the rotor shorted structure to higher operating loads. The melt will be maintained at some temperature greater than its melting temperature, the excess being superheat, with the degree of superheat and the investment temperature being cooperatively selected to assure mold filling. The rotation imparted to the mold will induce centrifugal forces directed outward to the periphery of the investment and will promote radial flow outward along the conductor bars where the individual metal flows will combine to form the end ring.

Although the gating geometry is depicted as comprising a common sprue and a single runner in FIG. 8, those skilled in the art will recognize that alternative or supplementary gating or venting may be beneficial in achieving consistent mold fill. Similarly it will be appreciated that the casting process may be conducted under at least partial vacuum and that the rotor forms shown with the conductor bars aligned with the direction of the applied centrifugal force may be inclined or otherwise oriented in an alternative manner without departing from the gist of the invention.

After the mold is filled, rotation is continued until solidification is substantially complete. After solidification concludes, the sand will be discharged from the mold, the investment broken open and the gating removed to recover the rotor with its cast shorted structure in conventional fashion.

The practice of the invention has been illustrated with some exemplary designs and configurations which are not intended to limit the scope of the invention.

The invention claimed is:

1. A method for forming a cast shorted structure on the rotor of an induction motor, the rotor having a rotor rotation axis and comprising a plurality of generally planar ferrous laminations arranged to form a lamination stack, the lamination stack being generally cylindrical and having two ends and a cylindrical surface; the shorted structure comprising two end rings coaxial with the rotor rotation axis, one of each end rings abutting each end of the lamination stack and a plurality of conductor bars positioned proximate to the cylindrical surface of the lamination stack and connected on their ends to the end rings, the method comprising;

applying a wax pattern of the shorted structure to the rotor;

attaching at least one wax pattern of a sprue and runner structure to the wax shorted structure pattern to form an investment pattern;

coating the investment pattern with a refractory coating to form an investment;

removing the wax from the investment to create a sprue, a runner structure, a first mold end ring region, a second mold end ring region and a plurality of conductor bar mold regions;

positioning the investment with the sprue positioned on and aligned with a casting rotation axis and with the rotor rotation axis inclined so as to be generally perpendicular to the casting rotation axis;

filling the investment with molten casting metal through the sprue while rotating the investment about the casting rotation axis to urge outwardly radial flow of the casting metal from the sprue in a direction generally aligned with the rotor rotation axis, the molten metal first entering the runner, then the first mold end ring region, then along the conductor bar mold regions before entering the second mold end ring region;

allowing the molten metal to solidify while the mold shell is continuing to rotate; and removing the gates and runners.

2. The method of claim 1 further comprising preheating the investment to a temperature substantially equal to the melting point of the casting metal.

3. The method of claim 2 further comprising supporting the investment in sand.

4. The method of claim 1 where the casting metal comprises one of the group consisting of substantially pure electrical grade copper, a copper alloy, substantially pure electrical grade aluminum, and an aluminum alloy.

5. The method for forming a cast shorted structure on the rotor of an induction motor recited in claim 1 in which the ferrous lamination stack comprises features to engage and retain the cast conductor bars.

6. The method for forming a cast shorted structure on the rotor of an induction motor recited in claim 5 in which the features are a plurality of enclosed hollow sections extending between the ends of the lamination stack from one end ring to the second end ring.

7. A method for forming a cast shorted structure on each of a plurality of induction motor rotors, each rotor comprising a plurality of generally planar ferrous laminations arranged and aligned to form a lamination stack, the lamination stack being generally cylindrical and having two ends and a cylindrical surface; the cast shorted structure comprising two end rings coaxial with the rotor rotation axis, one of each end rings abutting each end of the lamination stack and a plurality of conductor bars positioned proximate to the cylindrical surface of the lamination stack and connected on their ends to the end rings, the method comprising;

fabricating a mold of the cast shorted structure, the mold incorporating at least the rotor laminations, and comprising at least a runner for ingress of molten metal, the runner being connected to the mold at the location of one of the rotor end rings;

forming a substantially balanced mold assembly by assembling a plurality of molds arranged in substantial opposition to one another with their runners connected to a common central sprue, the sprue having a centerline with each of the molds being positioned on a common plane and each of the molds oriented with their conductor bars substantially perpendicular to the sprue centerline;

the mold assembly having a casting rotation axis substantially aligned and coincident with the centerline of the sprue;

filling the mold assembly with molten casting metal introduced through the sprue while rotating the mold assembly about the casting rotation axis to urge outwardly radial flow of the casting metal from the sprue, through the runner and a first end ring mold region, then along a plurality of conductor bar mold regions to a second end ring mold region; and allowing the molten metal to solidify while the mold assembly continues to rotate.

8. The method of claim 7 further comprising preheating the mold assembly to a temperature substantially equal to the melting point of the casting metal.

9. The method of claim 7 further comprising attaching at least a second mold assembly comprising a second sprue to a first mold assembly comprising a first sprue, the mold assemblies being so positioned and aligned that their sprues may be attached to create a continuous path for the molten metal and enable filling of all mold assemblies during a single pour.

10. The method of claim 9, further comprising a first fixture for positioning and supporting the molds comprising the first mold assembly and a second fixture for positioning and supporting the molds comprising the second mold assembly, the first and second fixtures being cooperatively adapted for releaseable attachment to one another.

11. The method of claim 10 where the first and second fixtures comprise at least one element adapted for alignment of the first fixture and the second fixture.

12. The method of claim 11 where the element is a hollow rib of uniform cross-section comprising an attachment at a first end, the attachment being rigidly attached to the rib, the attachment being of progressively reducing cross-section so that as the attachment of a first rib is progressively inserted into the opening at a second end of a second rib the attachment will guidably engage the opening of the second hollow rib to align the first and second ribs when full insertion is achieved.

13. The method of claim 12 in which the first and second ribs further comprise releasable locking features on the attachment and the second ends of the ribs such that full insertion of the attachment of the first rib into the opening of the second rib will promote a mechanical interference between the attachment of the first rib and opening of the second rib.

14. The method of claim 7 where the casting metal comprises one of the group consisting of substantially pure electrical grade copper, a copper alloy, substantially pure electrical grade aluminum, and an aluminum alloy.

15. The method for forming a cast shorted structure on the rotor of an induction motor recited in claim 7 in which the ferrous lamination stack comprises features to engage and retain the conductor bars.

16. The method for forming a cast shorted structure on the rotor of an induction motor recited in claim 15 in which the features are a plurality of enclosed hollow sections extending between the ends of the lamination stack from one end ring to the second end ring.

* * * * *